United States Patent [19]

Wians

[11] Patent Number: 5,540,308
[45] Date of Patent: Jul. 30, 1996

[54] PARKING LOCK FOR VEHICLE

[75] Inventor: Jeff Wians, Mebane, N.C.

[73] Assignee: Honda Giken Kogyo Kabushiki Kaisha, Tokyo, Japan

[21] Appl. No.: 280,815

[22] Filed: Jul. 26, 1994

[51] Int. Cl.⁶ .................................................. F61D 69/00
[52] U.S. Cl. ........................ 188/265; 188/22; 188/69; 188/82.77; 180/14.1; 74/97.1
[58] Field of Search .................. 188/265, 9, 19, 188/21, 22, 31, 60, 2 F, 69, 119, 166, 167, 211, 82.7, 82.77; 180/11, 14.1; 280/416; 561/11.3, 11.5, 11.8; 741/97.1

[56] References Cited

U.S. PATENT DOCUMENTS

| | | | |
|---|---|---|---|
| 818,326 | 4/1906 | Williams | 188/22 X |
| 1,045,632 | 11/1912 | Suppes | 188/31 |
| 1,303,110 | 5/1919 | Pfleeger | 188/31 |
| 2,100,447 | 11/1937 | Mahaffey | 280/33.55 |
| 2,880,034 | 3/1959 | Kamlukin | 188/9 X |
| 3,190,672 | 6/1965 | Swanson et al. | 280/32.7 |
| 3,200,907 | 8/1965 | Hansen | 188/31 X |
| 4,192,525 | 3/1980 | Clark | 280/443 |
| 4,416,460 | 11/1983 | Morris | 188/69 X |
| 4,998,948 | 3/1991 | Osterling | 56/12.6 |

FOREIGN PATENT DOCUMENTS 40-15927  7/1940  Japan .

*Primary Examiner*—Robert J. Oberleitner
*Assistant Examiner*—Peter M. Poon
*Attorney, Agent, or Firm*—Birch, Stewart, Kolasch & Birch, LLP

[57] ABSTRACT

A parking lock includes a support structure with steerable and rotatable wheels operatively mounted on the support structure. A locking wheel is operatively mounted on at least one of the steerable and rotatable wheel. A locking lever is pivotally mounted on the support structure. Receiving members are positioned on the locking wheel for operatively receiving the locking lever. A linkage is provided for operatively connecting the locking lever to the receiving members positioned on the locking wheel independently of the rotational and steering angle of the wheel.

22 Claims, 6 Drawing Sheets

5,540,308

PARKING LOCK FOR VEHICLE

BACKGROUND OF THE INVENTION

FIELD OF THE INVENTION

A parking lock is disclosed which is engageable with a locking wheel to lock a steerable and rotatable wheel of a vehicle independently of the rotation and steering angle of the wheel relative to the vehicle,

SUMMARY AND OBJECTS OF THE INVENTION

It is an object of the present invention to provide a parking lock which is operatively mounted relative to a steerable and rotatable wheel for operatively engaging a locking wheel independently of the rotation and steering angle of the wheel.

Another object of the present invention is to provide a parking lock which may be mounted relative to two wheels and engageable with each wheel independently for locking the wheel relative to a vehicle.

Another object of the present invention is to provide a parking lock which may lock a wheel in both a forward and a reverse direction.

A further object of the present invention is to provide a parking lock which is engageable when the wheels are straight or turned.

A still further object of the present invention is to provide a parking lock which may be used together with a lawnmower sulky.

These and other objects of the present invention are achieved by providing a parking lock which includes a support structure. A steerable and rotatable wheel is operatively mounted on the support structure. A locking wheel is operatively mounted on the steerable and rotatable wheel. A locking lever is pivotally mounted relative to said locking wheel. Receiving members are positioned on the locking wheel for operatively receiving the locking lever. A device is operatively connected to the locking lever and the receiving members positioned on the locking wheel to permit locking of the wheel independent of the rotation and steering angle of the wheel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
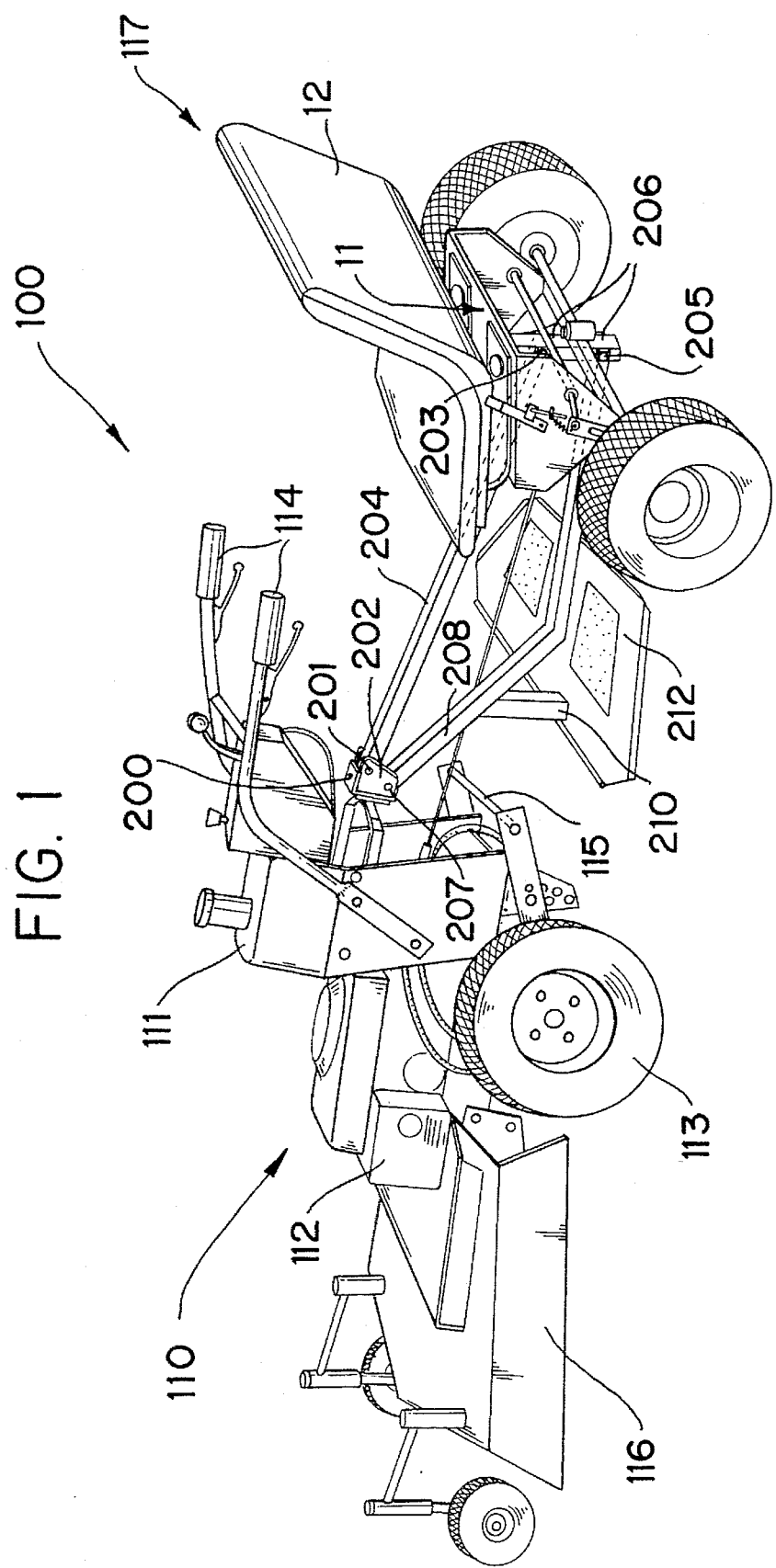
FIG. 1 is a perspective view illustrating a two-wheel tractor provided with a sulky mounted at the rear thereof.

As illustrated in FIG. 1, a lawnmower sulky device 100 includes a tractor 110 having a housing 111 and a motor and transmission assembly 112. Wheels 113 are operatively connected to the motor and transmission assembly 112 for imparting motion to the two-wheeled tractor 110. Control handles 114 are operatively mounted relative to the housing 111 for actuating the motor and transmission assembly 112. A control lever 115 is operatively connected to a lawnmower cutting device 116 for manually raising and lowering the lawnmower cutting device 116.

Figure 7:
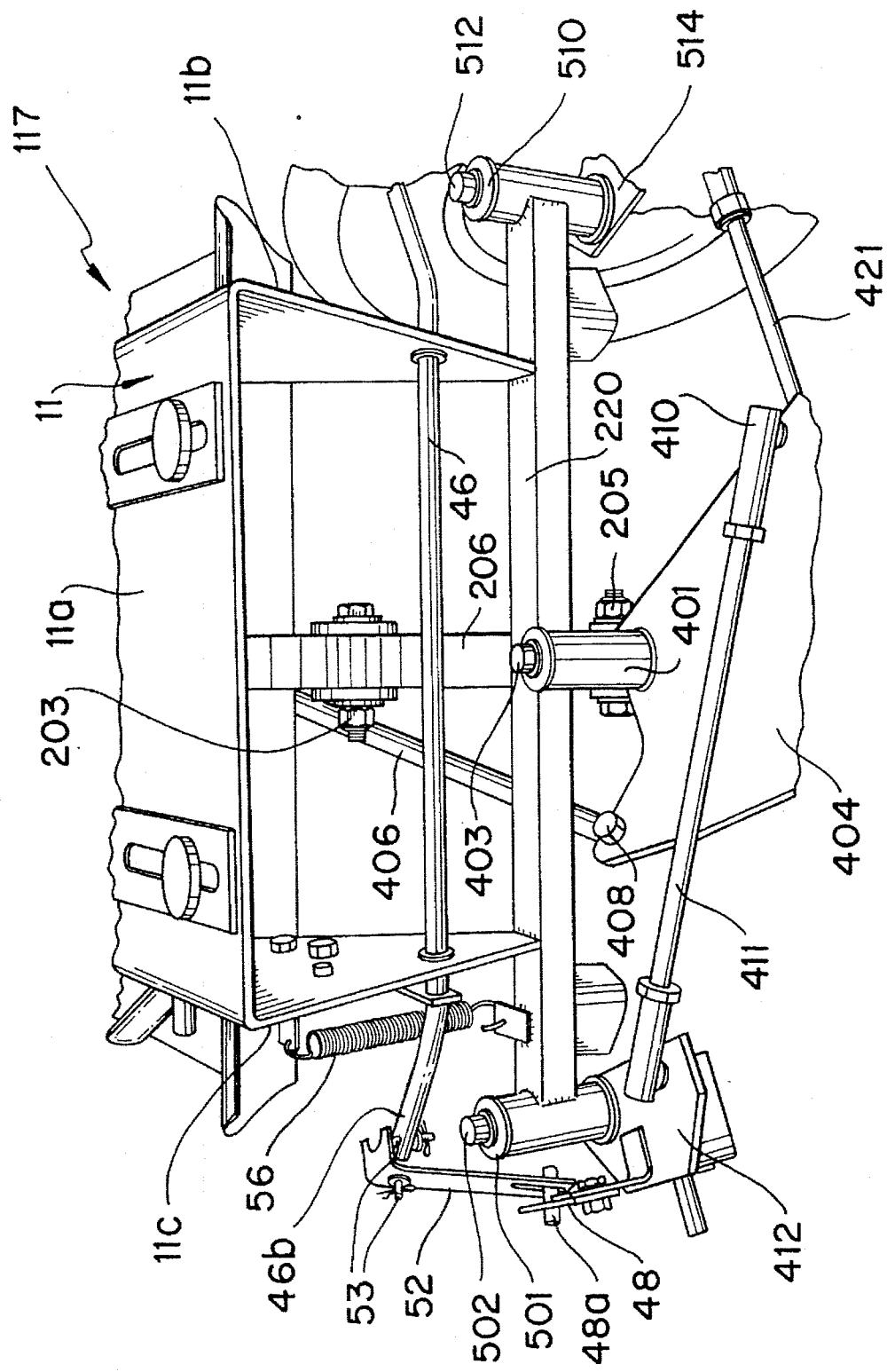
FIG. 7 is rear view of the lawnmower sulky illustrating the parking lock and the steering mechanism for the sulky.

A sulky 117 is provided which includes a seat 12 operatively mounted on a platform 11. Two steerable wheels 20 are secured to the platform 11. As illustrated in FIGS. 1 and 7, the sulky 117 is operatively connected to the two-wheeled tractor 110 by means of a four bar linkage. A first link or bracket 202 includes two substantially parallel plates secured to the two-wheeled tractor 110 by means of a bracket 200. A second link 204 is pivotally mounted at 201 to the first link 202. The second link 204 extends rearwardly and is operatively, pivotally connected at 203 to a third link 206. A fourth link 208 is pivotally connected at 207 to the first link 202 and extends rearwardly therefrom. A second end of the fourth link 208 is pivotally connected at 205 to the third link 206. A platform 212 for positioning an individual's feet during use of the sulky 117 is connected to the fourth link 208 by means of a support 210. The arrangement of the first, second, third and fourth links permits the positioning of the sulky 117 relative to the two-wheeled tractor 110 to be maintained in a predetermined orientation to ensure the comfort of an individual seated on the sulky.

Figure 2:
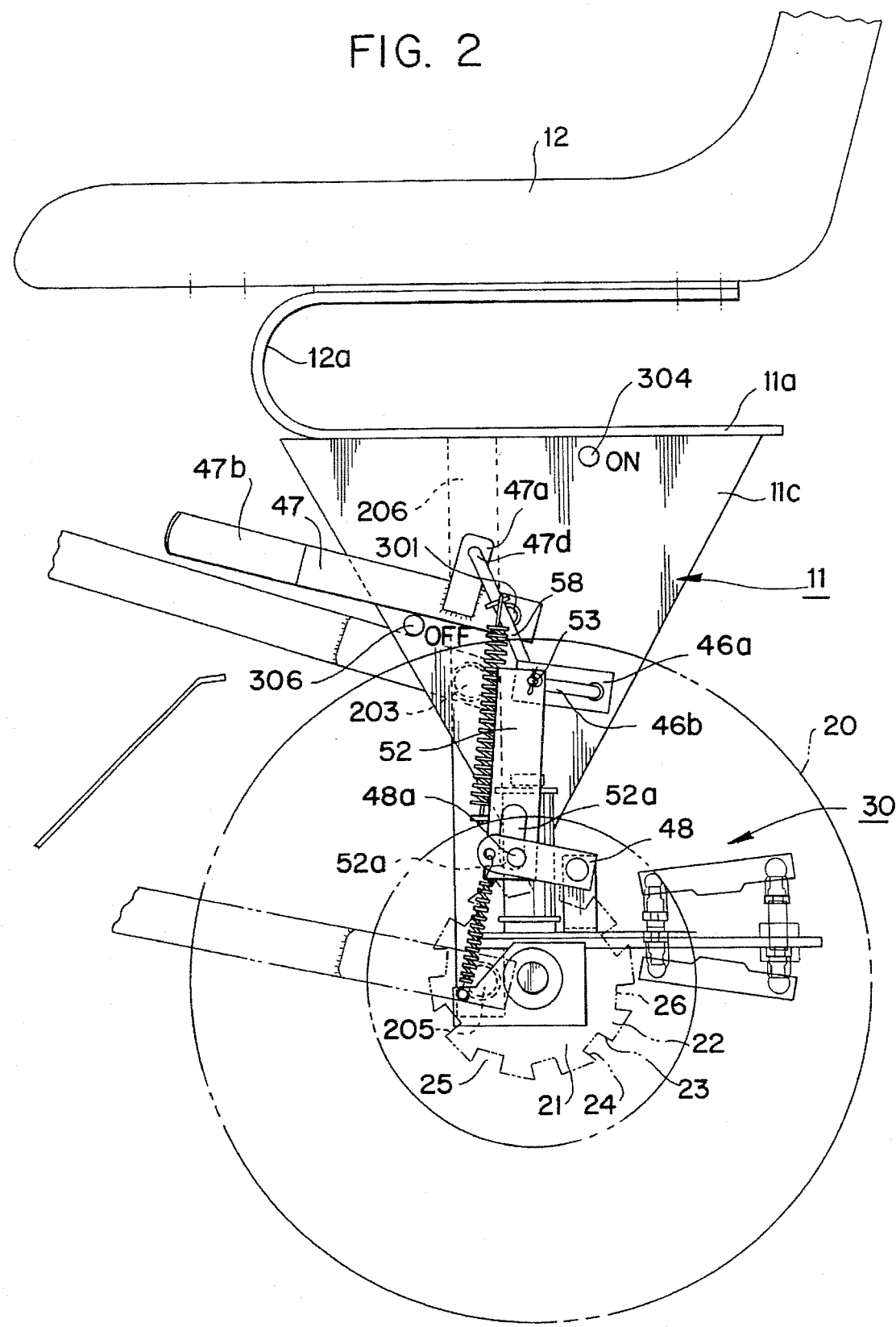
FIG. 2 is a partial cross-sectional view illustrating the parking lock in the OFF position and the wheel operatively connected to the locking wheel in dotted line.
Figure 3:
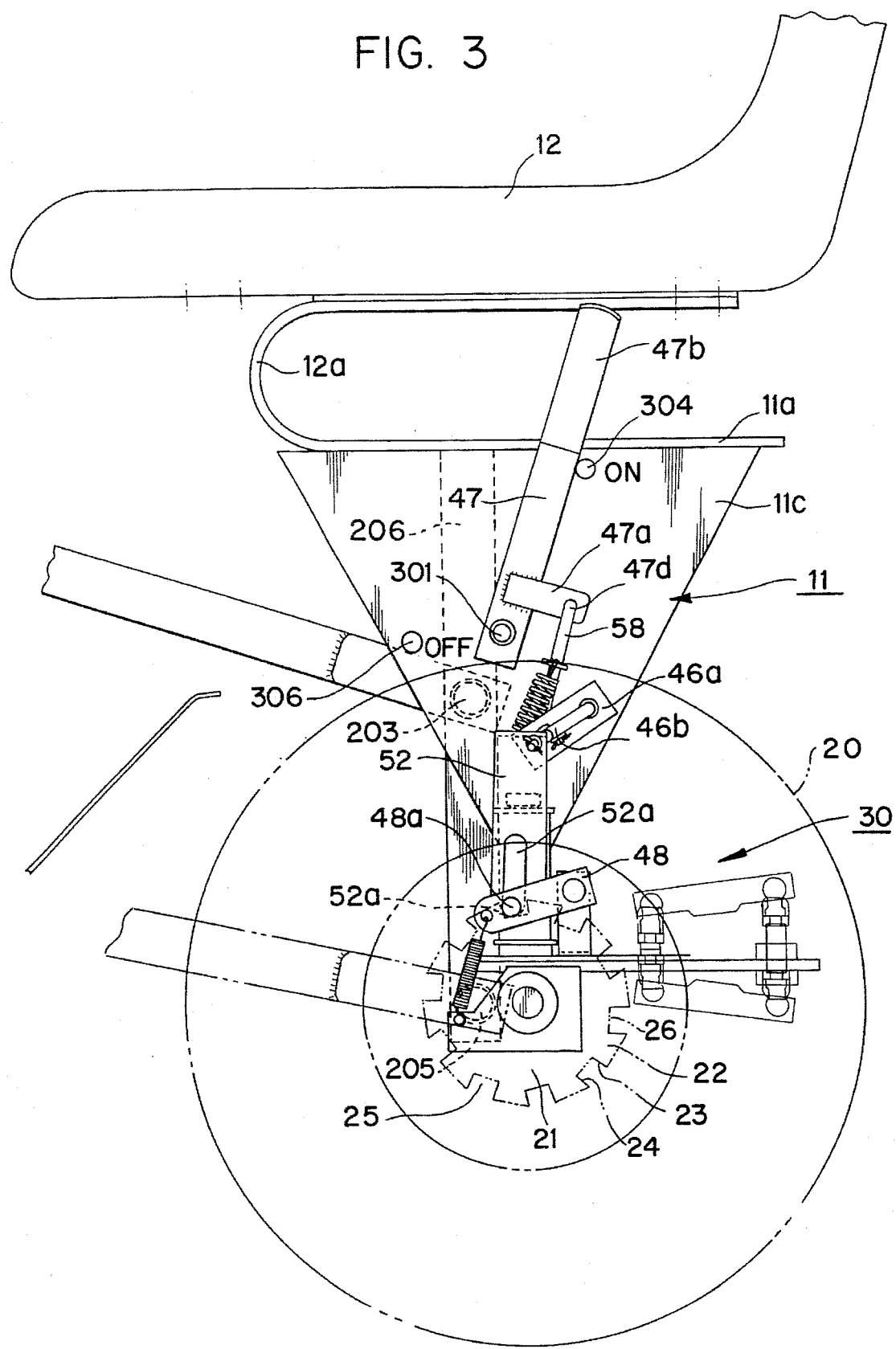
FIG. 3 is a partial cross-sectional view illustrating the parking lock in an ON position with the wheel operatively connected to the locking wheel illustrated in dotted line.

As illustrated in FIGS. 2, 3 and 7, the seat 12 is affixed to the platform 11. The platform 11 includes an upper wall 11a with two downwardly projecting walls 11b and 11c secured to side portions thereof. An axle support 220 extends between and is secured to end portions of the downwardly projecting walls 11b and 11c. The third link 206 is affixed to a bottom surface of the upper wall 11a of the platform 11 and to a central portion of the axle support 220. A spring 12a is operatively positioned between the upper wall 11a and the seat 12 to provide an individual positioned on the sulky with a cushion for the ride during use of the sulky 117.

A parking lock lever 47 includes a handle 47b. In addition, a link 47a is affixed adjacent to one end of the lever 47. A pivot point 301 operatively affixes the parking lock lever 47 relative to the downwardly projecting wall 11c of the platform 11.

As illustrated in FIGS. 2–4 and 7, an engaging rod 58 is secured between an aperture 47d in the link 47a to a lever 58a. The parking lock engaging rod 58 is operatively connected between the link 47a and a lever 58a for imparting movement thereto. A pivot arm 46a is secured to a pivot shaft 46 which extends through the downwardly projecting walls 11b and 11c of the platform 11 to be disposed adjacent to each wheel 20 disposed on each side of the sulky 117. The pivot arm 46a is rigidly secured to the pivot shaft 46 to impart movement to the pivot shaft 46 as the parking lock lever 47 is rotated to either a parking lock ON or a parking lock OFF position. Movement of the parking lock lever 47 imparts movement to the parking lock engagement rod 58 which is secured by means of an adapter 55 to impart rotation to the pivot arm 46a.

An actuating plate 52 is secured to an end of the pivot shaft 46b by means of an orthogonal pin 53. The orthogonal pin 53 permits movement of the pivot shaft 46 to be imparted to the actuating plate 52. The actuating plate 52 includes an elongated hole 52a which is adapted to receive a locking pin 48a secured to a locking lever 48.

An over-center spring 56 is operatively connected between the lever 58a and the downwardly projecting wall 11c of the platform 11. As the parking lock lever 47 is elevated to a parking lock ON position, the over-center spring 56 causes the parking lock lever 47 to be securely disposed adjacent to the pin 304 affixed to the downwardly projecting wall 11c of the platform 11. Similarly, when the parking lock lever 47 is moved to a parking lock OFF position, the over-center spring 56 ensures that the parking lock lever 47 will remain in the parking lock OFF position and abut the pin 306 secured to the downwardly projecting wall 11c of the platform 11.

A coil spring 49 is secured to the locking lever 48 and to the mounting housing for the wheel 20 for biasing the locking lever 48 in a downward direction. If the locking pin 48a is engaged on an outer circumferential surface of a locking wheel 21 which is secured to the wheel 20, the coil spring 49 biases the locking pin 48a downwardly so as to be positioned within a space 25 of the locking wheel 21 when the wheel 20 rotates. In this way, the coil spring 49 will bias the locking lever 48 in a parking lock ON position or a parking lock OFF position during use of the parking lock. Thus, the locking pin 48a will be securely disposed within a space 25 in the locking wheel 21.

Figure 5:
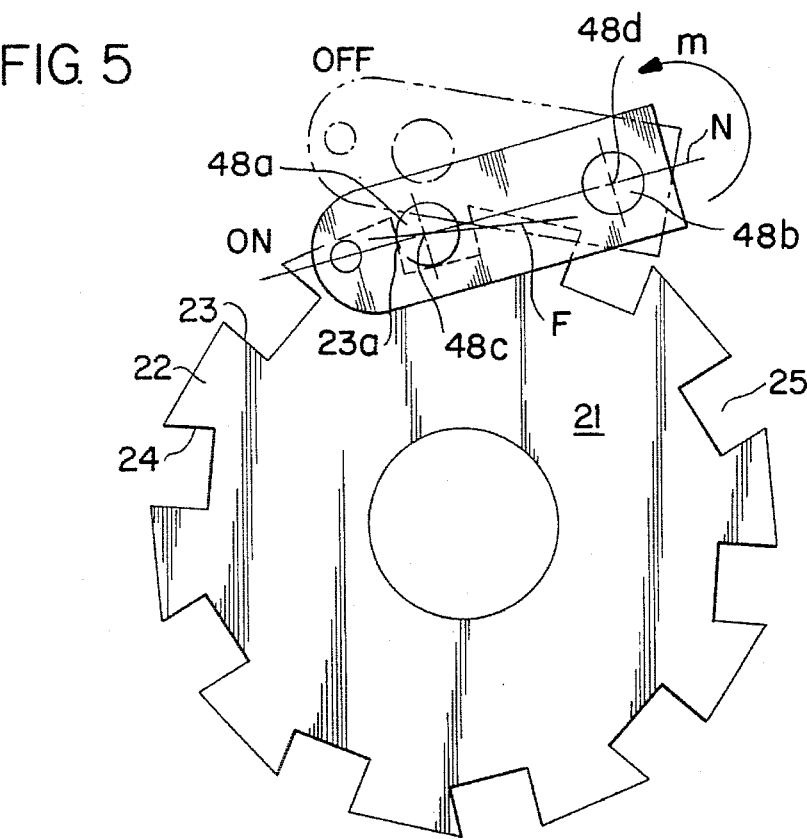
FIG. 5 is an enlarged view of the locking wheel illustrating the parking lock in the ON position with the vehicle trying to move in reverse.
Figure 6:
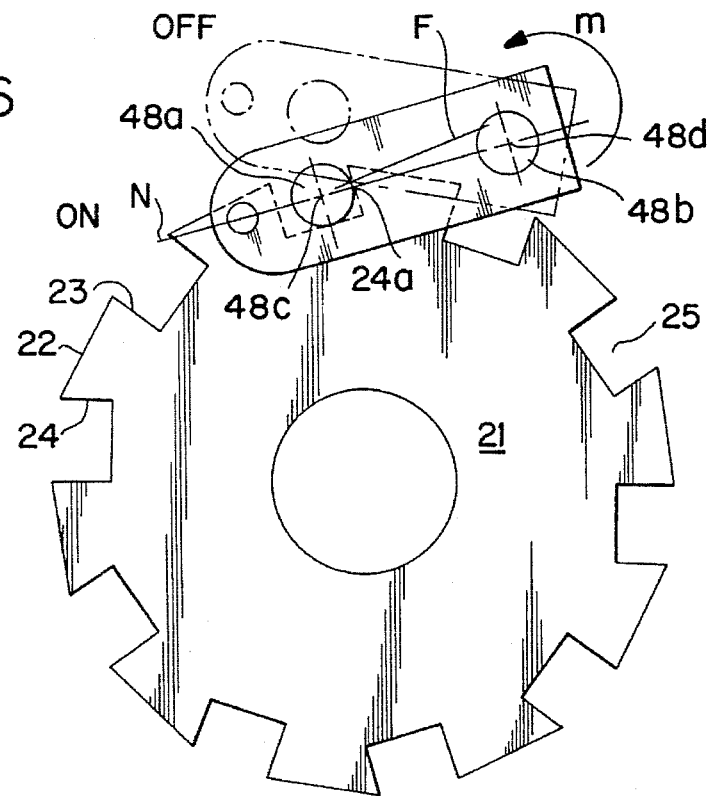
FIG. 6 is an enlarged view of the locking wheel illustrating the parking lock in the ON position with the vehicle trying to move in forward.

As illustrated in FIGS. 5 and 6, the locking wheel 21 includes teeth 22 disposed around the outer peripheral surface thereof. The teeth form spaces 25 which form receiving means or engaging means for receiving the locking pin 48a affixed to the locking lever 48. Each of the teeth 22 is formed by means of lateral edges 23, 24. As illustrated in FIG. 5, when the vehicle attempts to go in a reverse direction, the pin 48a affixed to the locking lever 48 is in engagement with a lateral edge 23 of the locking wheel 21. The space 25 formed in the locking wheel 21 actually forms a square space with the lateral edge 23 being parallel to the adjacent lateral edge 24. As illustrated in FIG. 5, the pin 48a includes a center point 48c which is aligned with the center point 48d of the pivot pin 48b when the parking lock is in the ON position and the vehicle is inclined to move in a rearward direction. The neutral line N connects the centers 48c, 48d positioned on the locking pin 48a and the pivot 48b of the lever 48 during this condition of the parking lock. The force exerted on the pin 48a by the edge 23a lies on a line of action F that extends to the right and radially inside the pivot center 48d. This creates a counterclockwise movement M about the pivot 48b. The movement M adds to the downward forces exerted by the actuating plate 52 and the spring 56 on the locking lever 48. This ensures that the locking pin 48a is biased into the space 25 and the wheel remains locked against rearward rotation.

When the sulky 117 is attempting to go in a forward direction, as illustrated in FIG. 6, the pin 48a is in engagement with the lateral edge 24a of the opening 25. This contact point 24a lies radially outside of the neutral line N. The force exerted on the pin 48a by the edge 24a lies on a line of action F that extends to the left and radially outside the pivot center 48d. This creates a counterclockwise moment M about the pivot 48b. This moment M adds to the downward forces exerted by the actuating plate 52 and the spring 56 onto the locking lever 48. This ensures that the pin 48a is biased into the space 25 and the wheel 20 remains locked against forward rotation.

Figure 4:
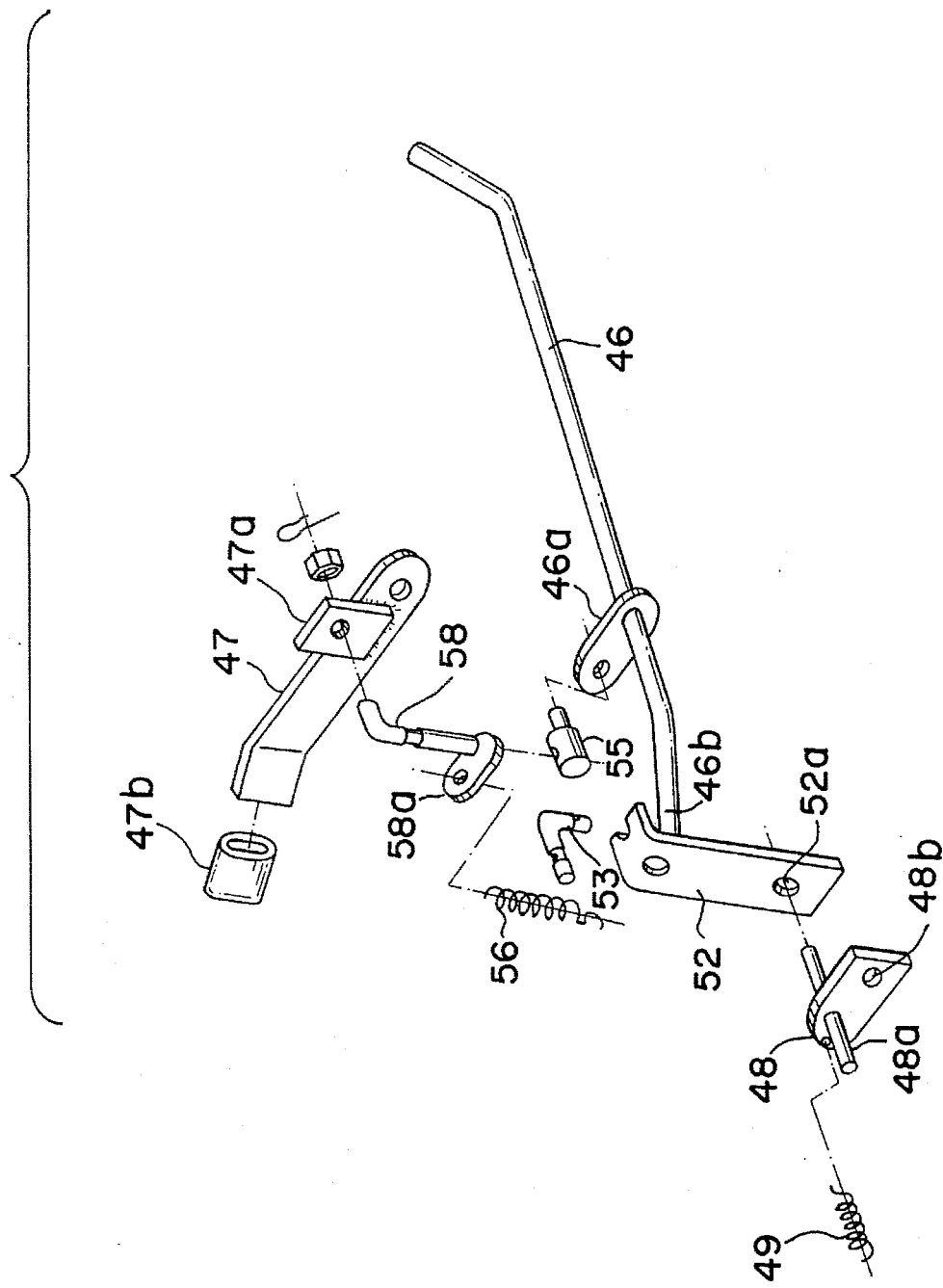
FIG. 4 is an exploded view illustrating the parking lock actuating mechanism according to the present invention.

As illustrated in FIGS. 2–4, when the parking lock lever 47 is elevated from an OFF position, as illustrated in FIG. 2, to an ON position, as illustrated in FIG. 3, the link 47a imparts movement to the parking lock engagement rod 58 to impart movement to the pivot arm 46a secured to the pivot shaft 46. Thereafter, the orthogonal pin 53 imparts movement to the actuating plate 52 to actuate the locking pin 48a by engagement with the elongated opening 52a in the actuating plate 52. When the parking lock handle 47 is elevated to the ON position, the locking pin 48a is brought into engagement with one of the spaces 25 in the locking wheel 21. In this way, the parking lock will secure the sulky in a predetermined position. The orthogonal pin 53 allows the plate 52 to pivot with the wheel 20 as the wheel 20 is steered. Thus, the steering of the wheel 20 will not interfere with the engagement of the parking lock. In other words, the wheel 20 is a steerable wheel which may be disposed to be aligned with the platform 11 and also actuated to be at an angle relative to the platform 11. Regardless, of the rotational disposition of the steerable wheel 20 relative to the platform 11, the plate 52 which will actuate the locking pin 48a will ensure the locking pin 48a comes into engagement with a space 25. The coil spring 49 will retain the locking pin 48a in the space 25 during the parking lock ON position. In addition, the over-center spring 56 will maintain the parking lock lever 47a in engagement with the pin 304 secured to the downwardly projecting wall 11c of the platform 11.

As illustrated in FIG. 7, the axle support 220 extends between the downwardly projecting walls 11b and 11c. A bearing housing 401 is secured to approximately the central portion of the axle support 220. A shaft 403 is positioned within the bearing housing 401 for supporting a steering plate 404. A bearing housings 501 and 510 are secured to end portions of the axle support 220. Shafts 502 and 512 are positioned within the bearing housings 501 and 510, respectively, for mounting wheel supports 412 and 514, respectively. The actuating plate 52 and the locking lever 48 are mounted on the wheel supports 412, 514 and pivot with the steerable wheels 20.

An actuating rod 406 is secured to the steering plate 404 at a pivot joint 408. Steering rods 411 and 421 are pivotally mounted at 410 and a pivot position on the underside of the steering plate, respectively, for imparting movement from the steering plate to the mounting wheel supports 412 and 514. The steering mechanism is generally illustrated as element 30 in FIGS. 2 and 3.

The locking mechanism according to the present invention may be employed with only one wheel of the sulky 117 or both wheels of the sulky 117. If the locking mechanism is employed with both wheels of the sulky 117, the mechanism used would merely be a duplication of the locking mechanism as described hereinabove.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A parking lock comprising:

a support structure;

a steerable and rotatable wheel operatively mounted on said support structure;

a locking wheel operatively mounted on said steerable and rotatable wheel;

a locking lever pivotally mounted relative to said support structure;

receiving means positioned on said locking wheel for operatively receiving said locking lever; and means for operatively connecting said locking lever to said receiving means positioned on said locking wheel independently of the rotational and steering angle of the wheel.

2. The parking lock according to claim 1, and further including biasing means for biasing said locking lever into engagement and disengagement with said locking wheel.

3. The parking lock according to claim 1, wherein said locking wheel rotates together with said steerable and rotatable wheel.

4. The parking lock according to claim 1, wherein said receiving means includes a plurality of circumferentially spaced teeth disposed on an outer circumferential surface of said locking wheel.

5. The parking lock according to claim 4, wherein each of said teeth includes a radial edge and a parallel edge, said radial edge being disposed along a radial line of said locking wheel, said parallel edge being circumferentially spaced from and parallel to said radial edge.

6. The parking lock according to claim 5, wherein said radial edge of an adjacent one of said teeth being connected by a perpendicular edge being mutually perpendicular to said radial and parallel edges.

7. The parking lock according to claim 1, wherein said receiving means includes a reaction means for applying a counterclockwise rotation on said locking lever when said locking lever has been engaged and said wheel rotates in a clockwise direction.

8. The parking lock according to claim 1, wherein said receiving means includes a reaction means for applying a counterclockwise rotation on said locking lever when said locking lever has been engaged and said wheel rotates in a counterclockwise direction.

9. The parking lock according to claim 1, and further including means for biasing said locking lever into engagement with said receiving means.

10. The parking lock according to claim 1, and further including a handle operatively connected to said locking lever and mounted for movement between a disengaged position and an engaged position.

11. A parking lock comprising:

a support structure;

a steerable and rotatable wheel operatively mounted on said support structure;

a locking wheel operatively mounted on said steerable and rotatable wheel, said locking wheel including a plurality of engaging means disposed thereon;

a locking lever pivotally mounted relative to said locking wheel for selectively being inserted into at least one of said engaging means for locking said locking wheel relative to said support structure; and an actuating plate operatively connected to said locking lever for operatively connecting said locking lever to said engaging means positioned on said locking wheel independently of the rotational and steering angle of the wheel.

12. The parking lock according to claim 11, and further including biasing means for biasing said locking lever into engagement and disengagement with said locking wheel.

13. The parking lock according to claim 11, wherein said locking wheel rotates together with said wheel.

14. The parking lock according to claim 11, wherein said engaging means includes a plurality of circumferentially spaced teeth disposed on an outer circumferential surface of said locking wheel.

15. The parking lock according to claim 14, wherein each of said teeth includes a radial edge and a parallel edge, said radial edge being disposed along a radial line of said locking wheel, said parallel edge being circumferentially spaced from and parallel to said radial edge.

16. The parking lock according to claim 15, wherein said radial edge of an adjacent one of said teeth being connected by a perpendicular edge being mutually perpendicular to said radial and parallel edges.

17. The parking lock according to claim 11, wherein said engaging means includes a reaction means for applying a counterclockwise rotation on said locking lever when said locking lever has been engaged and said wheel rotates in a clockwise direction.

18. The parking lock according to claim 11, wherein said engaging means includes a reaction means for applying a counterclockwise rotation on said locking lever when said locking lever has been engaged and said wheel rotates in a counterclockwise direction.

19. The parking lock according to claim 11, and further including means for biasing said locking lever into engagement with said engaging means.

20. The parking lock according to claim 11, and further including a handle operatively connected to said actuating plate and mounted for movement between a disengaged position and an engaged position.

21. A locking wheel for a parking lock comprising:

a wheel having a central axis of rotation and an outer circumferential surface;

a plurality of circumferentially spaced teeth disposed on the outer circumferential surface of said wheel;

a plurality of spaces disposed between adjacent teeth; and each of said spaces being formed by a radial edge and a parallel edge of adjacent teeth, said radial edge being disposed along a radial line passing through the axis of rotation of said wheel, said parallel edge being circumferentially spaced from and parallel to said radial edge;

said space including a bottom wall formed to be mutually perpendicular to said radial and parallel edges.

22. The locking wheel according to claim 21, wherein each tooth has a radial edge and a parallel edge on opposed sides thereof, the radial edge being nonparallel to the parallel edge on a same tooth, and a line passing along the parallel edge failing to intersect the axis of rotation of the wheel.

* * * * *